United States Patent Office 3,409,368
Patented Nov. 5, 1968

3,409,368
RANGING DEVICE
Humbert M. Fernandez, Orange County, Fla., assignor to Martin-Marietta Corporation, Middle River, Md., a corporation of Maryland
Filed Jan. 7, 1964, Ser. No. 336,230
11 Claims. (Cl. 356—5)

ABSTRACT OF THE DISCLOSURE

This invention relates to a laser ranging device that enables a user to avoid the spurious range responses which often accompanied the use of prior art ranging devices as a result of objects such as trees or rocks intervening between the ranging device and a selected remote object. An echo selector arrangement is advantageously disposed in the ranging device in accordance with this invention, by the use of which the user can cause pulses representative of the intervening objects to be disregarded, thus allowing only the pulses representative of the selected remote object to reach the range readout means of the device.

---

This invention relates to a ranging device for accurately determining the distance between a point of origin and a selected remote object, and more particularly relates to a ranging device of a modified radar type utilizing a pulse of energy, such as light, as the transmitted and received energy in a closed loop arrangement, and includes a unique technique for selecting the one echo of the plurality of echos received by the ranging device which was reflected by a selected remote object whereby the device accurately indicates the distance between the ranging device and such selected remote object.

In recent years several attempts have been made to utilize a high intensity pulse of light in a modified radar type ranging device for determining the distance between two spaced objects. Ranging devices of this type are conventionally referred to as laser ranging devices and commonly utilize the well known laser transceiver as the high intensity light pulse generator in a closed loop, radar type circuit. Basically, the laser beam of such prior known ranging devices is directed or aimed toward a selected remote object and a powerful pulse of light is transmitted. The transmitted pulse travels through the atmosphere to the selected remote object, strikes such object and is reflected back as an echo to the laser. The distance or range from the laser to the selected remote object is determined by a time interval counter having a frequency standard correlated in units of length, such as feet, yards, meters, etc. Thus, by starting the counter at the precise moment the pulse of energy is transmitted toward the selected remote object, the counter commences to count its frequency standard. The counter is then stopped when the first echo of the transmitted pulse of energy is received by the laser. By knowing the counter's standard frequency rate and by counting the number of frequency sweeps or oscillations of the standards frequency that occurs between the time the pulse was transmitted and the time the first echo is received by the ranging device, the number of oscillations counted per unit of time proportionally represents the time required for the pulse of energy to travel twice the distance between the ranging device and the selected remote object. This proportional time figure is simply converted into units of length by virtue of the fact that the speed of light per unit of time is also a known factor. Thus, the product of the time interval established by the counter and the speed of light per unit of time divided by two indicates the distance between the ranging device and the selected remote object in units of length. In general, the prior known laser ranging devices directly correlate units of time into units of length and utilize a visual display associated with the counter for directly indicating range in units of length.

Although laser ranging devices presently known are satisfactory in many respects, they are inherently inaccurate in that an undesired echo of the transmitted pulse of energy may prematurely stop the counter thereby resulting in inaccurate range computations. Undesirable echoes which cause premature stopping of the counter are commonly received by the laser whenever the direct line of sight to the selected remote object is impeded by an object or condition which reflects all or part of the transmitted pulse of energy. Such impeding objects or conditions which cause undesirable echoes are telephone wires or poles, tree branches, smoke, heavy fog, rain, clouds, etc. It will be apparent, therefore, that only one of the echoes received by the laser is the one reflected by the selected remote object and that it is this echo that must stop the counter in order to achieve accurate range information. From a practical standpoint any laser ranging device must be capable of accurately operating in an environment in which undesirable objects and conditions such as the above are in the direct line of sight to the selected remote object. This is so since such objects or conditions are not readily controllable nor is their existence reasonably predictable. The many problems confronting designers of laser ranging devices are basically condensed into one prime area, that of providing accurate and reliable means for selecting the one echo of a plurality of echoes received by the ranging device which was reflected by a selected remote object.

With more particularity, in order to determine the accurate range to a selected remote object it is necessary that the operator first know with substantial certainty whether o rnot a plurality of echoes are being received by the laser ranging device. In the prior art this information is not provided since the conventional frequency standard counter used stops counting when the first echo is received by the ranging device. The existence of subsequent echoes, which usually includes the one from the selected remote object, have no effect upon the ranging device and are generally not utilized in any way. It is also necessary that the operator know how many echoes are being received by the ranging device. This is important since it is almost certain that the last echo to arrive at the ranging device is the one reflected by the selected remote object. This is so since the laser beam is characteristically a substantially narrow beam and if the ranging device is accurately aimed all of the energy in the beam when it strikes the selected remote object will be reflected toward the ranging device. It is noted here that the undesirable objects and conditions in the direct line of sight to the selected remote object usually reflect merely part of the energy of the laser beam thereby enabling the remaining energy in the laser beam to continue towards the selected remote object. Finally, the operator of a laser ranging device must also be able to predeterminedly prevent any undesirable echoes from prematurely stopping the frequency standard counter. Preferably the operator should be able to inhibit counter "shut down" until immediately after arrival of the last undesirable echo and just prior to arrival of the desired echo.

In accordance with the present invention a conventional laser transceiver having transmit signal and echo signal processing circuits is utilized to start and stop a conventional time interval counter, with the transmitted laser signal and a selected echo being advantageously adapted to respectively start and stop the time interval counter. The present invention uniquely utilizes a manual echo selector interposed between the laser transceiver ECHO output circuit and the time interval counter STOP circuit.

In more detail, the manual echo selector of the present invention includes a quinary counter having a plurality of bistable stabes each having an ON and OFF state, and each being interposed by a corresponding AND gate, with each AND gate being adapted to prevent its respective succeeding bistable stage from switching to its ON state until its respective preceding bistable stage is switched to its ON state. Saying it conversely, the interposed AND gates are coupled in circuit so that the presence of an echo on the transceiver ECHO output circuit will cause only the bistable stage to switch to its ON state which is next succeeding a bistable stage that was previously switched to its ON state. Also, the first bistable stage of the quinary counter is specially arranged in a circuit so that the first bistable stage will always switch to its ON state when the first echo is received by the laser transceiver.

A selector switch (preferably mechanical) having a plurality of switch positions is also provided with each of such switch positions respectively coupled to one AND gate of a second plurality of AND gates. The outputs of the bistable stages of the quinary counter are also respectively coupled to one AND gate of the second plurality of AND gates, while the outputs of such second plurality of AND gates are coupled in common through an output AND gate to the time interval counter STOP circuit. The laser transceiver ECHO output circuit is also coupled to the output AND gate. When the echoes of the transmitted pulse are received by the laser transceiver, successive bistable stages of the quinary counter will be switched to their ON states and gating signals appropriately coupled to their respective AND gate of the second plurality of AND gates. However, the echoes coupled to the output AND gate will not be gated or passed to the time interval counter until a proper gating voltage or signal is coupled from at least one of the AND gates of the second plurality of AND gates to the output AND gate. The proper voltage or signal for gating the AND gates in the second plurality of AND gates is provided through the manual selector switch.

The manual selector switch is arranged in circuit so that each switch position, except the first position, will open only one of the AND gates of the second plurality of AND gates and appropriately open the output AND gate and allow the selected echo to stop the time interval counter. Basically, the Selector Switch is preferably associated with the second plurality of AND gates so that the first switch position will always permit a gating signal to pass to the output AND gate so that not only will the first echo received by the transceiver be coupled to the time interval counter STOP circuit, but also all subsequent echoes received, where as the second position of the selector switch will permit only the second echo received to pass to the time interval counter STOP circuit and inhibit all other echoes received. Correspondingly similar echo selection and inhibition occurs with regard to the remaining switch positions.

In addition to the foregoing, the manual echo selector preferably includes a plurality of visual indicators respectively associated with each bistable stage of the quinary counter. These indicators visually display the number of echoes received so as to assist the operator in selecting the appropriate switch position and correspondingly select which echo of the plurality of echoes received is the desired echo to stop the time interval It is, therefore, a primary object of the present invention to provide a ranging device which accurately determines the distance between a point of origin and a selected remote object.

It is another object of the present invention to provide a ranging device of a modified radar type which utilizes a pulse of light as the transmitted and received energy in a closed loop arrangement.

It is another object of the present invention to provide a laser ranging device of a modified radar type which is capable of accurately determining the range to a selected remote object yet be capable of operating in an environment in which undesirable objects and conditions, such as telephone wire or poles, tree branches, smoke, heavy fog, rain, clouds, etc. are in the direct line of sight to the selected remote object.

It is another object of the present invention to provide a laser ranging device of a modified radar type which includes a technique for selecting the one echo of a plurality of echoes received by the ranging device which was reflected by a selected remote object, and includes indicating means which enable such device to accurately indicate the distance between the ranging device and such selected remote object in units of length.

It is another object of the present invention to provide a laser ranging device of a modified radar type which enables the operator thereof to determine with substantial certainty whether or not a plurality of echoes are being received by the device; to enable the operator to determine how many echoes are being received by the device; and to enable the operator to select the one echo of the plurality of echoes received which was reflected by a selected remote object so as to prevent undesirable echoes from causing inaccurate ranging computations.

These and further objects and advantages of the present invention will become more apparent upon reference to the following description and claims and the appended drawings wherein:

Figure 3:
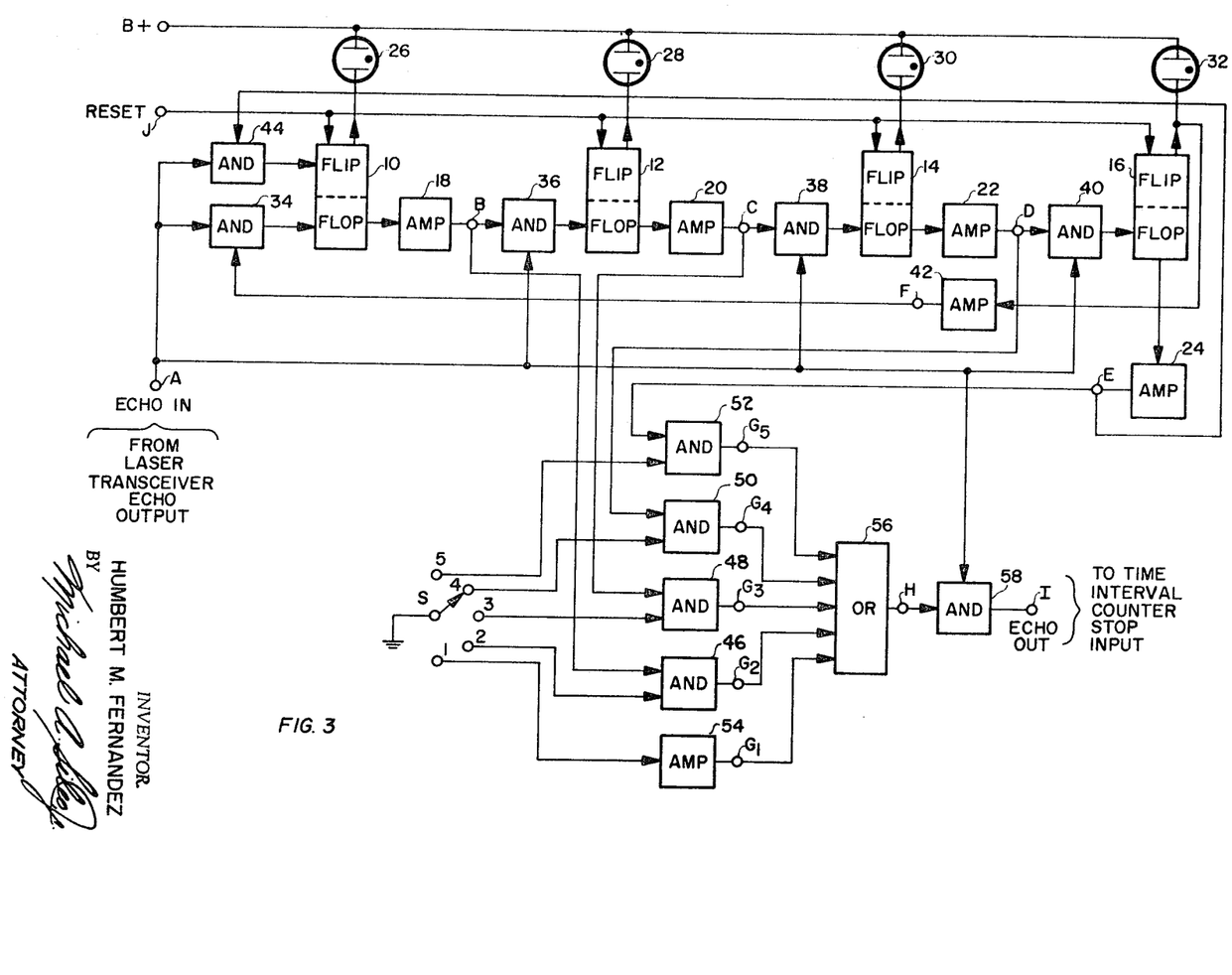
FIGURE 3 depicts a detailed block diagram of the portion of FIG. 1 which is set out by dashed lines and includes in detail the Manual Echo Selector 8, Visual Echo Display 9, and Selector Switch S. In this figure the echo input from (STOP) terminal Y of FIG. 1 is coupled to terminal A of this figure, whereas the selected echo output appearing on terminal I of this figure is coupled to the STOP terminal Z of FIG. 1.

For purposes of simplicity and clarity the manual echo selector and visual echo display of FIG. 3 include four stages and four respective indicators, and is capable of handling the reception of five successive echoes.

It is to be understood, of course, that additional stages and corresponding visual indicators can be incorporated into the counter of FIG. 3, as well as additional manual switch positions and respective AND gates, without departing from the spirit and scope of the present invention.

Figures 1, 2, 5:
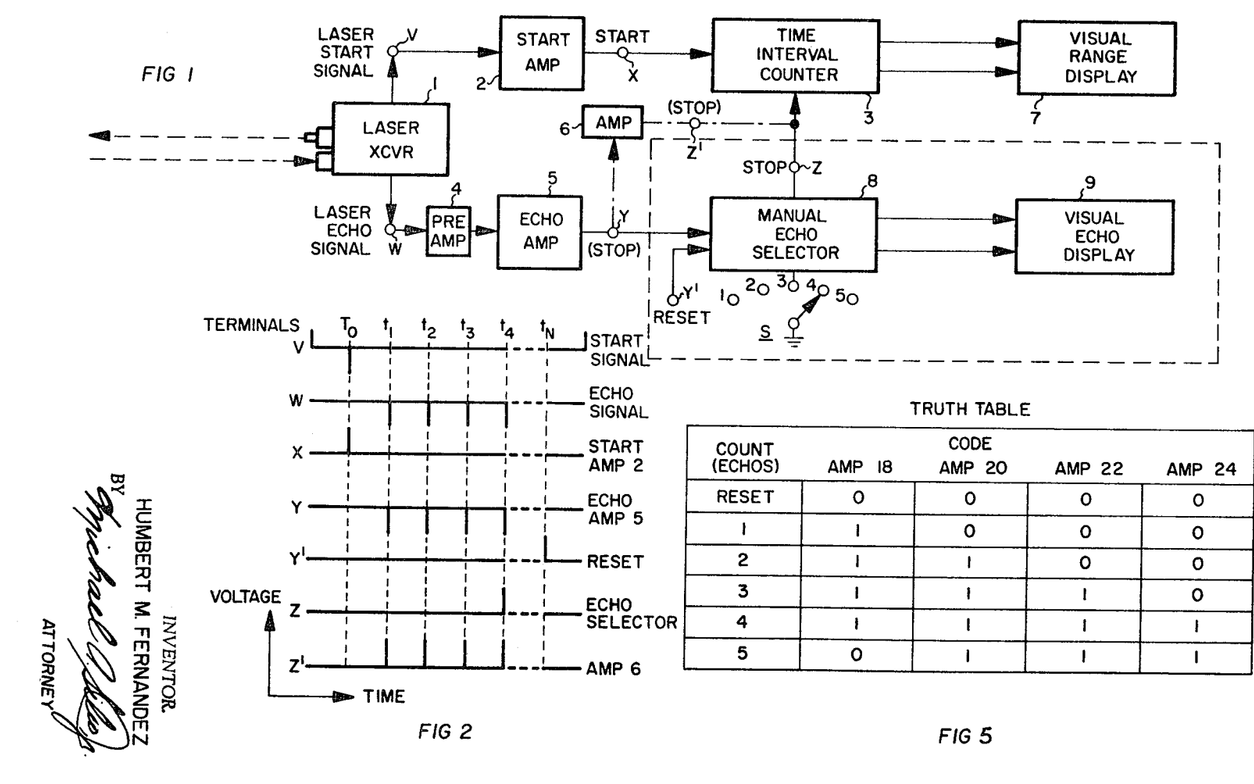
FIGURE 1 is a block diagram of a preferred embodiment of the laser ranging device in accordance with the present invention. The portion of this figure which is enclosed by dashed lines represents the unique echo selection technique of the present invention as combined with a prior known laser ranging device. The portion of this figure between (STOP) terminal Y and (STOP) terminal Z' is included for purposes of showing the prior art technique for stopping the time interval counter conventionally utilized in laser ranging devices.
FIGURE 2 depicts several waveforms present at several appropriate terminals in the block diagram of FIG. 1.
FIGURE 5 sets forth a truth table and shows the outputs of amplifiers 18, 20, 22 and 24 of FIG. 3 in corresponding relationship to the reception of five successive echoes received and processed by the laser ranging device of the present invention.

*Detailed description—FIGURES 1–2*

Referring to FIG. 1 there is shown a block diagram of a laser ranging device incorporating in accordance with the present invention a unique technique for selecting a desired echo from a plurality of echoes received by the device.

A conventional laser transceiver 1, such as the Department of the Army, Frankford Arsenal, XM–23 Model, is provided for transmitting a pulse of light toward a selected remote object (not shown) the distance to which is desired, and for receiving and processing echoes of the transmitted pulse of light. The laser transceiver 1 is conventional in design and includes means for developing a signal which is time related to the time the laser transceiver transmits a pulse of light for commencing the counting operation of the time interval counter 3, and means for processing echoes of the transmitted pulse of light so that a selected echo may be utilized to stop the counting operation of the time interval counter 3. Since the laser transceiver 1 is of conventional design and is well known to those skilled in the prior art, a detailed showing thereof is not considered necessary for purposes of describing the present invention.

Referring to the upper portion of FIG. 1, the laser START signal generated by the laser transceiver 1 is coupled via terminal V to a conventionally designed START amplifier 2, which may be any well known pulse amplifier. The output of the START amplifier 2 is coupled via START terminal X to a Time Interval Counter 3, which is also of conventional design and may be, for example, any well known high-speed counter having a capability of accurately counting a stable frequency standard. When the laser transceiver 1 transmits a pulse of light, the laser START Signal is coupled via terminal V, START amplifier 2 and START terminal X to the Time Interval Counter 3. When the first echo is received by the laser transceiver 1 it is processed in a conventional manner, such as reshaped, and coupled to pre-amplifier 4, which is also a conventional pulse amplifier, via terminal W and then coupled to the (STOP) terminal Y via ECHO amplifier 5 which also may be any well known pulse amplifier.

It should be noted at this point that in the prior art the echo signal present at (STOP) terminal Y is coupled conventionally through a pulse amplifier 6 to a (STOP) terminal Z' and thereby causing the time interval counter 3 to stop counting its frequency standard. In FIG. 1 this portion of the circuit is shown in dashed lines separated by dots merely to exemplify the prior art time interval counter "shut down" circuitry. In practical applications of any laser ranging device, however, the first echo received by the device is not necessarily a reflection from a preselected remote object but may have been reflected from an undesirable object or condition in the direct line of sight between the device and the preselected remote object. Such undesirable objects or conditions commonly encountered are telephone lines or poles, tree branches, smoke, heavy fog, rain, clouds, etc. Thus, when an undesirable object or condition is in the direct line of sight between the ranging device and the preselected remote object, an undesirable echo will be processed by the device and caused to prematurely "shut down" the time interval counter so that its count will proportionately represent a distance less than the distance between the ranging device and the preselected remote object. The present invention advantageously prevents premature "shut down" of the time interval counter by undesirable echoes by incorporating a manual echo selector 8 and a visual echo display 9 between the (STOP) terminal Y at the output of the ECHO amplifier 5 and the STOP terminal Z at the input of the time interval counter 3.

Referring to the lower portion of FIG. 1, the echoes received and processed by the laser transceiver 1 appear on (STOP) terminal Y and are appropriately coupled to the manual echo selector 8. Selector 8 includes a manual switch S and a reset terminal Y'. Selector 8 is designed so that any one of a plurality of echoes received and processed by the laser transceiver 1 may be preselected as the echo desired to stop or "shut down" the time interval counter 3. Basically, this echo selection feature is provided by moving selector switch S to one of its positions, such as position four of the five positions shown. This selection of selector switch position four, for example, prevents the first three echoes received by the laser transceiver 1 from being coupled to the time interval counter 3, but permits only the fourth echo received to be coupled to counter 3 and consequently stop the counter. Visual echo display 9 is conventionally associated in circuit with the positions of selector switch S so as to provide means for developing visual indications of the echoes received by the laser transceiver 1 up to the capacity of the selector 8, such as five echoes as shown. It should be noted that although selector 8 merely shows a capability for handling five echoes, additional echo handling capability may be provided without departing from the spirit and scope of the present invention. A detailed description of a preferred embodiment of a manual echo selector 8, a visual echo display 9 and a selector switch S appears below with regard to the block diagram of FIG. 3.

Reset terminal Y' is included to functionally represent means for resetting the manual echo selector 8 and visual echo display 9 so that a subsequent range computation may be made.

Referring specifically to FIG. 2, several pulse waveforms present at certain appropriately selected terminals of the block diagram of FIG. 1 are shown for purposes of explanation. The start signal is generated by the laser transceiver 1 and appears on terminal V during time $T_0$. Characteristically, this signal is a negative going pulse of a finite width which conventionally is amplified and phase inverted 180° as shown at the start terminal X, which is the output of start amplifier 2, also at time $T_0$. This positive going pulse appearing at terminal X is then coupled to the time interval counter 3, wherein it causes the counter 3 to commence counting its frequency standard. The echoes of the pulse of energy transmitted by the transceiver 1 are also negatively going pulses of finite width and appear at terminal W at time $t_1$ through $t_4$. The processed echo signals appearing at terminal W are then coupled through the preamplifier 4 to the echo amplifier 5, wherein they are preferably amplified and subsequently utilized to stop the time interval counter 3. Such signals heretofore in the prior art laser ranging devices are coupled to the time interval counter (STOP) terminal Z' via a conventional pulse amplifier which further amplifies the echoes and causes a phase shift of substantially 180° so that such signals are of proper amplitude and polarity. Thus, in the prior art the very first echo received by the transceiver 1 is approximately amplified and phase inverted and then coupled to the time interval (STOP) circuit. As stated earlier this may result in premature "shut down" of the time interval counter 3 by undesirable echoes received by the laser transceiver 1.

In accordance with the present invention, however, the echo signals appearing on terminal Y are processed by the manual echo selector 8 before being coupled to the time interval counter 3. Depending upon the position of the echo selector switch S, only one of the echo signals received and processed by the laser transceiver 1 will be coupled to the STOP terminal Z and appropriately utilized to stop the time interval counter 3. In the example shown in FIG. 1, the echo selector switch S is in its fourth position, thereby preventing the first three echoes received and processed by the transceiver 1 from prematurely stopping the time interval counter 3, but allowing the fourth echo received and processed by transceiver 1 to stop the time interval counter 3. The fourth echo, which is utilized to stop the counter 3, appears at stop terminal Z and is a positive going pulse having a finite width. The pulses that would appear at the STOP terminal of counter 3 in prior art ranging devices are shown in FIG. 2 at terminal Z' merely to exemplify what signals would be coupled to the counter 3 in the absence of the echo selector technique of the present invention, whereas the selected echo which appears at the STOP terminal of counter 3 are shown in FIG. 2 at terminal Z to exemplify the fact that only the fourth echo received by the laser transceiver 1 is coupled to counter 3.

Figure 4:
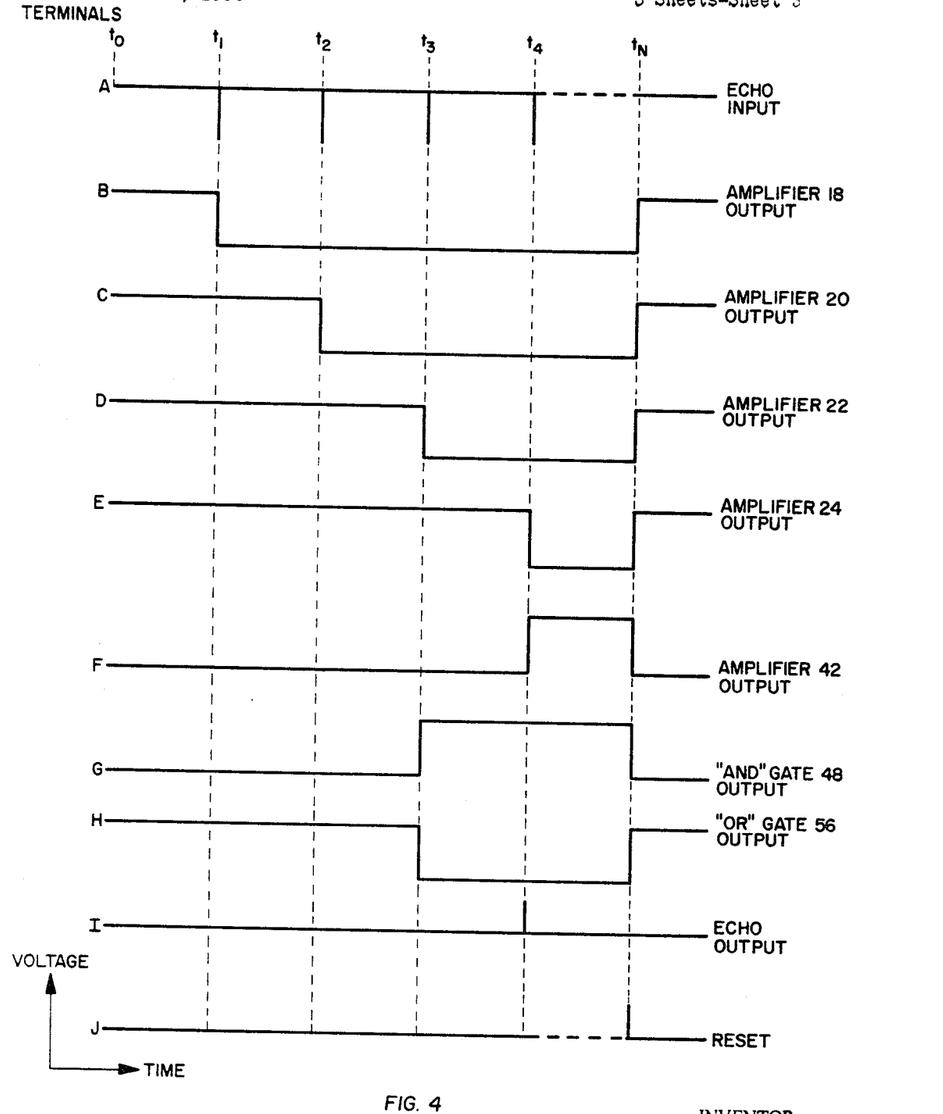
FIGURE 4 depicts several waveforms present at several appropriate terminals in the block diagram of FIG. 3.

Detailed description—FIGS. 3–4

FIG. 3 sets forth a detailed block diagram of the portion of FIG. 1 which is set out by dashed lines, and includes in detail the manual echo selector 8, visual echo display 9 and selector switch S of FIG. 1. The circuit of this figure would be electrically associated with the circuit of FIG. 1 by coupling the (STOP) terminal Y of FIG. 1 to the ECHO IN terminal A of FIG. 3 and by coupling the ECHO OUT terminal I of FIG. 3 to the time interval counter STOP terminal Z of FIG. 1. FIG. 4 shows several waveforms present at appropriately selected terminals of the block diagram of FIG. 3 for purposes of assisting in the description of this circuit.

The preferred embodiment of the manual echo selector 8 of FIG. 3 basically consists of a four stage high speed counter having four bi-stable or flip-flop stages 10, 12, 14 and 16. One of the outputs of each flip-flop stages 10, 12, 14 and 16 are respectively coupled to amplifiers 18, 20, 22 and 24, whereas the other output of each flip-flop stage is respectively coupled to one plate of the conventional neon indicator tubes 26, 28, 30 and 32. Each of the neon indicators has its other plate connected in common to a B+ source of supply and are designed so as to ignite only when its respective flip-flop stage 10, 12, 14 or 16 is in its ON state.

For exemplary purposes only, the indicators 26, 28, 30 and 32 may be respectively connected across the output impedance of one side of the bistable or flip-flop stages 10, 12, 14 and 16. Thus, when this one side of the flip-flop stages 10, 12, 14 and 16 conducts, i.e., they are in their ON state in the example shown, the drop in potential across such output impedance provides a potential difference across the plates of indicators 26, 28, 30 and 32 which is sufficient to cause ionization thereof. It will be apparent, however, that other circuit arrangements for indicators 26, 28, 30 and 32 is contemplated and such other arrangements may be substituted herein without departing from the spirit of this invention so long as the indicators are sequentially affected in time relationship to the presence of echos on the ECHO IN terminal A.

A plurality of AND gates 34, 36, 38 and 40 are provided for controlling the sequential operation of flip-flop stages 10, 12, 14 and 16 and have their outputs respectively coupled to the inputs of flip-flop stages 10, 12, 14 and 16, and their first input respectively coupled to terminals A to D. To complete the basic four stage counter, amplifiers 18, 20 and 22 have their outputs respectively coupled to terminals B to D. In order to provide a handling capability of five conditions or echoes as the case here, one side of flip-flop stage 16 is coupled through a conventional pulse amplifier 42 to terminal F which in turn is coupled to the second input of AND gate 34; whereas terminal E, which is coupled to the other side of flip-flop stage 16, is coupled to the second input of AND gate 44. Triggering or enabling signals, which are the echoes present on ECHO IN terminal A, are simultaneously coupled to the first input of each of the AND gates 34, 36, 38, 40 and 44. A detailed description of the sequential enabling of flip-flop stages 10, 12, 14, and 16 is set forth below in the Mode of Operation of FIG. 3.

Referring now to the lower portion of FIG. 3, a plurality of AND gates 46, 48, 50 and 52 are shown with their first input respectively coupled to positions two to five of manual selector switch S and their outputs coupled to the OR gate 56 via terminals $G_2$, $G_3$, $G_4$ and $G_5$. The second input of each of the AND gates 46, 48, 50 and 52 is respectively coupled to terminals B to E. Selector switch S has its first position coupled through a conventional pulse amplifier 54 to terminal $G_1$ which in turn is coupled to OR gate 56. An output AND gate 58 is provided for gating a selected echo through ECHO OUT terminal I to the time interval counter STOP terminal Z. AND gate 58 has its first input coupled to the ECHO IN terminal A, its second input terminal coupled to terminal H, which is the output terminal of OR gate 56, and its output terminal coupled to ECHO OUT terminal I. It will be apparent from the foregoing that when a voltage is present at terminal H and an echo is present at terminal A, such echo will appear at ECHO OUT terminal I and appropriately stop or "shut down" the time interval counter 3. Further, the time of occurrence of a voltage at terminal H directly depends upon both the switch position of selector S and the switching time of the corresponding flip-flop of the flip-flop stages 10, 12, 14 and 16.

Since a detailed description of the Mode of Operation of the block diagram of FIG. 3 is set forth below, it will suffice to now merely state that the switch portion of echo selector switch S will advantageously permit only a selected echo of the echoes present at terminal A to pass through AND gate 58 to the ECHO OUT terminal I. Thus, the bistable stages 10, 12, 14 and 16 sequentially provide a gating signal or voltage for AND gates 46, 48, 50 and 52 in time relation to the sequential appearance of echoes on ECHO IN terminal A. Depending upon the switch position of selector switch S, only one of the AND gates 46, 48, 50 or 52 will be open and accordingly provide a gating signal or voltage at terminal H, the output terminal of OR gate 56 and the input terminal of AND gate 58. Accordingly, the echo which appears on ECHO IN terminal A during the time interval that one of the AND gates 46, 48, 50 or 52 is open will be the only echo coupled to the time interval counter 3 via ECHO OUT terminal I and time interval counter STOP terminal Z.

Mode of operation—FIGURES 3–4

In the following Mode of Operation of the present invention as depicted in FIGS. 3 and 4, it will be assumed (1) that the selector switch S is in position 4 as shown in FIG. 3; (2) that the bistable or flip-flop stages 10–16 are in their first stable or OFF state, i.e. the side of the flip-flop stages 10–16, which are respectively connected to the neon indicators 26–32, are in their low current condition, whereas the other side of flip-flop stages 10–16, which are respectively connected to amplifiers 18–24, are in their high current condition; (3) that the neon indicators 26–32 are de-ionized; (4) that all AND gates in the block diagram of FIG. 3 are negative AND gates in that the presence of two or more negative or ground voltages are necessary before a voltage will be present on the output of the AND gates; (5) that OR gate 56 is designed such that the presence of a voltage at any one of its inputs causes a negative voltage or signal to appear at its output terminal H; (6) and it is desired that the fourth echo received by the transceiver 1 is the echo reflected by a selected remote object and that this fourth echo is the one desired to stop the time interval counter 3 from counting its frequency standard.

When the first echo received and processed by the transceiver 1 appears on ECHO IN terminal A, it is coupled simultaneously to AND gates 34–40 and 44, as well as output AND gate 58. It should be noted at this point that at time $t_0$ the flip-flop stage 16 is in its OFF state. The signals coupled from both sides of flip-flop 16 are graphically represented at terminals E and F of FIG. 4 which respectively corresponds to the output of amplifiers 24 and 42. Thus, at time $t_0$ the potential at terminal E will be high, thereby inhibiting AND gate 44; whereas the potential at terminal F will be low and thereby enabling AND gate 34 and permit the first echo appearing on terminal A to pass through AND gate 34 to the flip-flop stage 10.

At time $t_1$ the first echo appears at terminal A and is coupled to flip-flop stage 10 since AND gate 34 is enabled by the voltage developed by amplifier 42 which appears on terminal F. Flip-flop stage 10 is thereby driven to its second stable state hereinafter referred to as its ON state. When flip-flop stage 10 is driven to its ON state the side of the flip-flop which is connected to the neon indicator 26 falls to a low voltage point thereby providing sufficient potential difference across the plates of neon indicator 26 to cause ionization of the gas within the neon indicator 26 driving it to its ON or "glow" state. When flip-flop 10 changes to its ON state, the other side of the flip-flop stage 10 to amplifier 18 will be amplified and phase inverted substantially 180°, as graphically represented at terminal B in FIG. 4. Note also that amplifiers 18, 20, 22, 24 and 42 must have a delay equal to or greater than the pulse width of the echoes present on ECHO IN terminal A to prevent premature application of a gating voltage to the succeeding AND gates 36, 38, 40, 34 and 44, respectively. The voltage at terminal B is then coupled to both the AND gates 36 and 46 thereby opening both of these AND gates. It should be noted at this point that AND gates 46–52 are designed so that their output terminals $G_2$–$G_5$, respectively, are at a low potential and will remain at this potential until one of their input terminals is grounded and the other of their input terminals receives a low or negative voltage or signal. It will be apparent at this point that the grounding of one of the input terminals of the AND gates 46–52 directly depends upon the position of the echo selector switch S, and in the example described in FIG. 3 only AND gate 50 is grounded. Thus, until a negative or low voltage is coupled to the other input terminal of AND gate 50, the output terminal $G_4$ will remain at a low potential. Terminals $G_2$, $G_3$ and $G_5$, of course, will always remain at a low potential notwithstanding the switching of their respective flip-flop stage 10, 12 or 16.

At time $t_2$ a second echo is received and processed by transceiver 1 and simultaneously coupled to AND gates 34–40 and 44, as well as output AND gate 58. Although the second echo received will be gated through AND gate 34, it will have no effect upon the condition of flip-flop stage 10 since this flip-flop has previously switched to its ON state by the reception of the first echo at time $t_1$. However, the low voltage at terminal B, which was caused by the switching of flip-flop stage 10 to its ON state, opens AND gate 36 and allows the second echo to pass through AND gate 36 and drive flip-flop stage 12 into its ON state. Again, the voltage drop at the side of flip-flop stage 12 which is connected to the neon indicator 28 causes indicator 28 to ionize. The switching of flip-flop stage 12 to its ON state causes the voltage at terminal C, which is the output of amplifier 20, to drop to a low potential, as shown in FIG. 4. The voltage at terminal C is then coupled both to AND gate 38 and to AND gate 48, thereby opening both of these AND gates. Since AND gate 48 is not grounded by the echo selector switch S, the voltage at its output terminal $G_3$ will remain in its low voltage state.

At time $t_3$ the third echo appears on terminal A and it is also simultaneously coupled to AND gates 34–40, 44 and 58. Since flip-flop stages 10 and 12 have been previously driven to their ON states, the presence of the third echo appearing on terminal A passes through AND gates 34 and 36 but has no effect upon flip-flop stages 10 and 12. However, since the voltage at terminal C has dropped to a low level due to the switching of flip-flop stage 12 to its ON state, the third echo passes through AND gate 38 and drives flip-flop stage 14 into its ON state. Again, the neon indicator 30 is caused to ionize due to the change in potential across its plates when the flip-flop stage 14 switches from its OFF to its ON state. When flip-flop stage 14 switched to its ON state, the voltage at terminal D, which is the output of amplifier 22, drops to a low potential, as shown in FIG. 4, and the potential present on terminal D is simultaneously coupled to AND gates 40 and 50. Note here, that AND gate 50 has one of its input terminals grounded through the fourth switch position of the echo selector switch S. Thus, the presence of a negative voltage or signal on the other input terminal of AND gate 50 will cause the output terminal $G_4$ of this AND gate to rise to a high potential.

It should be noted at this point that when flip-flop stage 14 switched to its ON stage, a negative potential or signal is supplied to one of the input terminals of AND gate 50, and since the other input terminal of AND gate 50 is grounded through switch position 4 of echo selector switch S, the voltage at terminal $G_4$ will rise to a more positive potential level thereby causing the output terminal H of the OR gate 56 to fall to a low potential level as shown in FIG. 4, thus, opening AND gate 58. Any subsequent appearance of an echo on terminal A, which is also coupled to the other input terminal of AND gate 58, will be gated through output AND gate 58 to the ECHO OUT terminal I.

At time $t_4$ when the fourth echo appears on terminal A it will have no effect upon flip-flop stages 10, 12 and 14 since each of these flip-flops have been previously switched to their ON states. However, the fourth echo will be gated through AND gate 40 and drive flip-flop stage 16 to its ON state. Thus, at time $t_4$ when the fourth echo appears on terminal A, it will have no effect upon AND gates 34–38 or AND gate 44. However, it will pass through AND gate 58 to the ECHO OUT terminal I and accordingly stop the time interval counter from counting its frequency standard. For the reasons as above stated with regard to neon indicators 26–30, the neon indicator 32 will be caused to ionize when flip-flop stage 16 switches to its ON state.

It will be apparent from the foregoing that the fourth echo received by the transceiver 1 will be the only echo coupled to the time interval counter 3 via stop terminal Z, and that all previous echoes as well as any subsequent echoes received will not cause the time interval counter 3 to stop counting its frequency standard. Accordingly, the echo selector technique of the present invention advantageously prevents any undesired echoes from prematurely stopping the time interval counter 3 and thereby causing inaccurate range computations.

Although the fifth echo, if any is received by the ranging device of the present invention, would have no effect upon the time interval counter 3, it will be apparent from the foregoing that a fifth echo could have been selected as the desired echo to stop the time interval counter 3. This is so because the output of flip-flop stage 16 is respectively coupled through amplifiers 24 and 42 and terminals E and F to AND gates 44 and 34, respectively. This cross-coupling feedback circuit arrangement of flip-flop stage 16 causes AND gate 34 to now be inhibited and AND gate 44 to be enabled. Accordingly, the presence of a fifth echo on terminal A will now pass through AND gate 44 and not through AND gate 34 thereby causing flip-flop 10 to switch to its OFF state and thus cause neon indicator 26 to return to its deionized condition. This in turn causes the voltage at terminal B to rise to a higher level and thereby close gate 36. Thus, when the sixth echo, if any, appears on terminal A it will have no affect upon flip-flop stage 12 since it cannot pass through AND gate 36 and will have no effect upon flip-flop stages 14 and 16 since they have previously switched to their ON states. This circuit arrangement limits the echo handling capability of the device of FIG. 3 to five echoes.

After completion of a range computation, the flip-flop stages 10, 12, 14 and 16 must be returned to their OFF state in readiness for any subsequent range computation. This feature is provided by incorporating a RESET terminal J which is coupled to each of the flip-flop stages 10, 12, 14 and 16. In the circuit of FIG. 3, a reset signal, such as a negative pulse of finite width, is coupled to the side of each flip-flop stage 10, 12, 14 or 16 which is connected to neon indicators 26, 28, 30 and 32. Thus, when a reset signal appears on RESET terminal J, any flip-flop stage which is in its ON state will be driven to is OFF state. The reset signal of course will have no effect upon any flip-flop stage which is in its OFF state.

It should be noted at this point, however, that the incorporation of additional flip-flop stages and corresponding AND gate circuitry will enable the echo selector technique of the present invention to handle the reception of more than five echoes, and such incorporation of additional flip-flop stages does not depart from the spirit and scope of the present invention.

Practical experimentation of the ranging devices of the present invention indicates that a five echo handling capability is sufficient for most ranging computations under average environmental conditions. Of course, the present invention is advantageously applicable to military usage in artillary range finders. A lesser echo handling capability should be sufficient for use of the present invention in commercial and civilian applications, such as, surveying, mapping, navigation, etc.

It should be further noted at this point that the echo selector switch S when placed in its first switch position, grounds the amplifier 54 and causes the potential at terminal $G_1$ to rise to a higher potential level thereby causing the potential at terminal H of the OR gate 56 to fall to a low potential level. Thus, any echo present on terminal A when switch S is in its first position will be gated through AND gate 58 to the ECHO OUT terminal I, and accordingly coupled to the time interval counter STOP terminal Z. This switch position is provided so that the operator of the ranging device may aim at a selected remote object and determine three essential bits of information: first, whether or not more than one echo is being received and processed by the transceiver 1; second, how many echoes are being received and processed by the transceiver 1; and finally, which one of the several echoes received and processed by the transceiver 1 is the echo desired to stop the time interval counter 3. Since the operation of the echo selector switch S of the present invention is not dependent upon the operation of the time interval counter 3, the time interval counter 3 will in most cases record erroneous range information when the selector switch S is in its first position. It is preferable to have a first position, however, in the event that no undesirable objects are in the direct line of sight between the ranging device and the selected remote object. Thus, when the operator of the ranging device of the present invention notices that only one echo was received and processed by the transceiver 1, then the range information on the visual range display 7 will represent an accurate distance between the ranging device and the selected remote object. In practical use of the present invention, it has been determined that more frequently than not there exists undesirable objects in the direct line of sight between the ranging device and the selected remote object. Thus, when the operator determines the existence of more than one echo, and decides which echo he desires to stop the time interval counter 3 by visually surveying the ionized conditions of neon indicator 26-32, he merely moves the echo selector switch S to its switch position corresponding to the numbered echo he desires to stop the time interval counter 3. Also note at this point that in practical use of a laser ranging device, generally the last echo received is the echo reflected by the selected remote object. This is so since the laser beam is considerably narrow and if properly aimed all the energy striking the remote object will be reflected back toward the laser ranging device. This is further true due to the fact that most undesirable objects in the direct line of sight between the laser ranging device and the selected remote object merely reflect part of the pulse of light transmitted by the transceiver 1, and thereby enable the remaining energy of the pulse of light to continue toward the selected remote object thereby causing a plurality of echoes to be received and processed by the transceiver 1.

*Detailed description—FIGURE 5*

FIGURE 5 shows a truth table with the outputs of amplifiers 18, 20, 22 and 24 of FIG. 3 set forth in corresponding relationship to the reception of five sequential echoes received and processed by the laser transceiver 3. The first vertical column of the truth table shows the COUNT (ECHOES) from RESET, which represents zero echoes, through five sequential counts or echoes. The remaining vertical columns show the high or low voltage condition of the outputs of amplifiers 18, 20, 22 and 24. For sake of simplicity the integers zero and one are used to indicate the low voltage and high voltage conditions, respectively. Note here that when the outputs of amplifiers 18, 20, 22 and 24 are at a low voltage condition, their respective flip-flop stage 10, 12, 14 or 16 is in its OFF state.

Since a truth table is self explanatory by nature, it will suffice to merely state that since all of the horizontal columns are different from each other they can be utilized to represent a code or other intelligence. In the example depicted in FIG. 3, neon indicators 26, 28, 30 and 32 are utilized to visually indicate the zero or one condition of amplifiers 18, 20, 22 and 24 or stated differently the ON or OFF condition of flip-flop stages 10, 12, 14 and 16. Thus, when all the indicators 26, 28, 30 and 32 are off, zero echoes have been received, whereas when indicator 26 is on only, one echo has been received. Similar visual logic can be determined with regard to the existence of other indicators being on or off as the case may be in accordance with the truth table of FIG. 5. It is therefore possible for the operator of the ranging device of the present invention to visually determine the reception of a plurality of echoes by the transceiver 1 and to establish with substantial certainty the exact number of echoes up to the maximum echo handling capacity of the ranging device. The operator of the ranging device merely moves the selector switch to a position which corresponds in number to the echo he desires to stop the time interval counter 3.

It will be apparent from the foregoing that the present invention advantageously provides a ranging device which accurately determines the distance between a point of origin and a selected remote object. The present invention uniquely includes a technique for selecting the one echo of a plurality of echoes received by the ranging device which was reflected by the selected remote object and prevents undesirable echoes from prematurely stopping a calibrated time interval counter resulting in erroneous range computations.

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service, while still retaining certain features which may properly be said to constitute the essential items of novelty involved, which items are intended to be defined and secured by the appended claims.

I claim:

1. A time interval measurement system for indicating the distance between a point of origin and a selected remote object, comprising a laser transceiver for transmitting a pulse of light from the point of origin toward the remote object, and for receiving echoes of said transmitted pulse, time interval counter means connected to convert the time interval between transmission of a pulse of light and the receipt of an echo thereof into an indication of range, and echo selector means connected between said transceiver and said time interval counter means, said echo selector means enabling one or more received echoes representative of false targets to be disregarded, so that only the echo representative of the selected remote object will be coupled into said time interval counter means, whereby latter device can provide the range to the selected remote object.

2. A time interval measurement system for proportionally representing the distance between a point of origin and a selected remote object comprising, in combination:
(a) a laser transceiver for transmitting a pulse of light from said point of origin towards said remote object, and for receiving echoes of said transmitted pulse;
(b) a first counter having two inputs and connected to convert the time interval between the transmission of a pulse of light and the receipt of an echo thereof into an indication of range;
(c) signal coupling means coupled between said transceiver and one input of said counter for coupling a signal to said counter which is indicative of the time said transceiver transmits said pulse of light, said signal serving to start said counter; and
(d) an echo selector coupled between said transceiver and the other input of said counter for selecting the one echo of said echoes received by said transceiver which was reflected by said remote object, and for coupling said selected echo to said counter and thereby selectively stopping said counter, whereby the count on said counter proportionally represents the distance between said point of origin and said selected remote object.

3. A time interval measurement system in accordance with claim 2, wherein said echo selector includes:
(a) a second counter comprising a plurality of bistable stages, said second counter having one input and an output for each of said bistable stages;
(b) a plurality of AND gates respectively coupled to said outputs of said bistable stages, said AND gates having their outputs connected in common to said other input of said first counter; and
(c) a selector switch having a plurality of positions respectively coupled to said AND gates;
(d) said echoes received by said transceiver being coupled to said input of said second counter, and said bistable stages being sequentially enabled in corresponding relationship to the reception of said echoes by said transceiver so that said selected echo is the echo that enabled the bistable stage corresponding to a selected switch positon of said selector switch.

4. A time interval measurement system in accordance with claim 3, wherein said echo selector further includes:
(a) an output AND gate having one of its inputs coupled in common to the outputs of said plurality of AND gates, its other input coupled to said input of said second counter, and its output connected to said other input of said first counter so that said selected echo will be gated through said output AND gate when the AND gate of said plurality of AND gates corresponding to a selected position of said selector switch is opened.

5. A time interval measurement system in accordance with claim 4, wherein said second counter includes:
(a) a second plurality of AND gates individually coupled between adjacent second counter stages; and
(b) said second gates causing said second counter stages to be sequentially enabled in corresponding relationship to the reception of said echoes by said transciever.

6. A time interval measurement system in accordance with claim 5, wherein said echo selector further includes:
(a) a plurality of visual indicators respectively coupled to said bistable stages; and
(b) said indicators being individually activated in corresponding sequence to said sequential enabling of said bistable stages, whereby said indicators sequentially indicate the reception of said echoes by said transceiver so that said selector switch may be selectively moved to said selected switch positon thereby causing said selected echo to be coupled to said first counter through said output AND gate.

7. A laser ranging device for determining the distance between said device and a selected remote object comprising, in combination:
(a) a laser transceiver for transmitting a pulse of light from said device toward said remote object, and for receiving echoes of said transmitted pulse, one of said echoes being reflected by said remote object;
(b) a time interval counter having start and stop input circuits and connected to convert the time interval between the transmission of a pulse of light and the receipt of an echo thereof into an indication of range;
(c) first amplifying means coupled between said transceiver and said start input circuit of said time interval counter for coupling a start signal which is indicative of the time said transceiver transmits said pulse of light, said start signal causing said time interval counter to commence counting; and
(d) an echo selector coupled between said transceiver and said stop input circuit of said time interval counter for selecting said echo reflected by said remote object, said selector coupling a stop signal to said time interval counter which is indicative of the time said transceiver receives said echo reflected by said remote object, said stop signal causing said time interval counter to cease counting so that the count on said time interval counter proportionally represents the distance between said device and said selected remote object.

8. A laser ranging device in accordance with claim 7 wherein said echo selector includes:
(a) a quinary counter having a plurality of bistable stages respectively coupled to a plurality of AND gates, and a selector switch having a plurality of switch positions also respectively coupled to said plurality of AND gates;
(b) said bistable stages of said quinary counter being sequentially enabled by said echoes received by said transceiver; and
(c) said selected echo being the echo that enables the bistable stage of said quinary counter which is coupled to a selected switch position of said selector switch.

9. A laser ranging device in accordance with claim 8 wherein said echo selector further includes:
(a) an output AND gate having one of its inputs connected in common to the outputs of said plurality of AND gates, its other input coupled to receive said echoes received by said transceiver, and its output coupled to said time interval counter so that said selected echo will be gated through said output AND gate when the AND gate of said plurality of AND gates corresponding to a selected position of said selector switch is open.

10. A laser ranging device in accordance with claim 9 wherein said quinary counter includes:
(a) a second plurality of AND gates individually coupled between adjacent bistable stages of said quinary counter; and
(b) said second plurality of AND gates causing said bistable stages of said quinary counter to be sequentially enabled in corresponding relationship to the reception of said echoes by said transceiver.

11. A laser ranging device in accordance with claim 10 wherein said echo selector further includes:
(a) a plurality of visual indicators respectively coupled to said plurality of bistable stages of said quinary counter; and
(b) said indicators being individually activated in corresponding sequence to said sequential enabling of said bistable stages of said quinary counter, whereby said indicators visually indicate the number of echoes received by said transceiver so that said selector switch may be selectively moved to said selected switch positon thereby causing said selected echo to be coupled to said stop input circuit of said time interval counter through said output AND gate.

References Cited

UNITED STATES PATENTS 3,103,661  9/1963  Hahn _______________ 343—7.3

OTHER REFERENCES

Peck et al., "Progress in Technology," Electrical Engineering, June, 1963, vol. 82. No. 6, pp. 419 and 420.

JEWELL H. PEDERSEN, *Primary Examiner.*

F. L. EVANS, *Assistant Examiner.*